United States Patent [19]
Takahashi et al.

[11] 3,939,724
[45] Feb. 24, 1976

[54] AUTOMOTIVE VEHICLE SHIFT CONTROL MECHANISM FOR MANUAL TRANSMISSIONS

[75] Inventors: Yasuie Takahashi, Toyota; Isao Tsuzuki, Kariya, both of Japan

[73] Assignee: Toyota Jidosha Kogyo Kabushiki Kaisha, Japan

[22] Filed: July 18, 1974

[21] Appl. No.: 489,610

[30] Foreign Application Priority Data
Nov. 19, 1973 Japan............................ 48-129159

[52] U.S. Cl. ...................... 74/476; 74/477; 74/475
[51] Int. Cl.² ......................................... F16H 57/06
[58] Field of Search .............. 74/476, 477, 475, 473

[56] References Cited
UNITED STATES PATENTS

| | | | |
|---|---|---|---|
| 3,192,788 | 7/1965 | Fodrea................................. | 74/476 |
| 3,264,893 | 8/1966 | Stott et al. ........................... | 74/477 |
| 3,269,208 | 8/1966 | Whitchurch......................... | 74/473 |
| 3,597,992 | 8/1971 | Lowry.................................. | 74/476 |
| 3,866,488 | 2/1975 | Nakata................................. | 74/476 |

Primary Examiner—Samuel Scott
Assistant Examiner—Randall Heald
Attorney, Agent, or Firm—Toren, McGeady and Stanger

[57] ABSTRACT

A shift control mechanism is provided for a multiple-forward-speed manual transmission which controls operation of the shift lever between the reverse drive position and one forward drive position to prevent inadvertent shifting which might damage the transmission. A transmission lever whose movement is controlled through the shift lever is formed with a projection extending therefrom which is adapted to engage a movable pin mounted in a housing. The housing is axially movable along a guide shaft and the pin is movable between an extended and a retracted position relative to the housing. The erroneous shifting operation between the reverse drive position and the one forward drive position is prevented by engagement between the projection and the pin in a manner which does not interfere with appropriate shifting of the transmission during vehicle operation.

15 Claims, 13 Drawing Figures

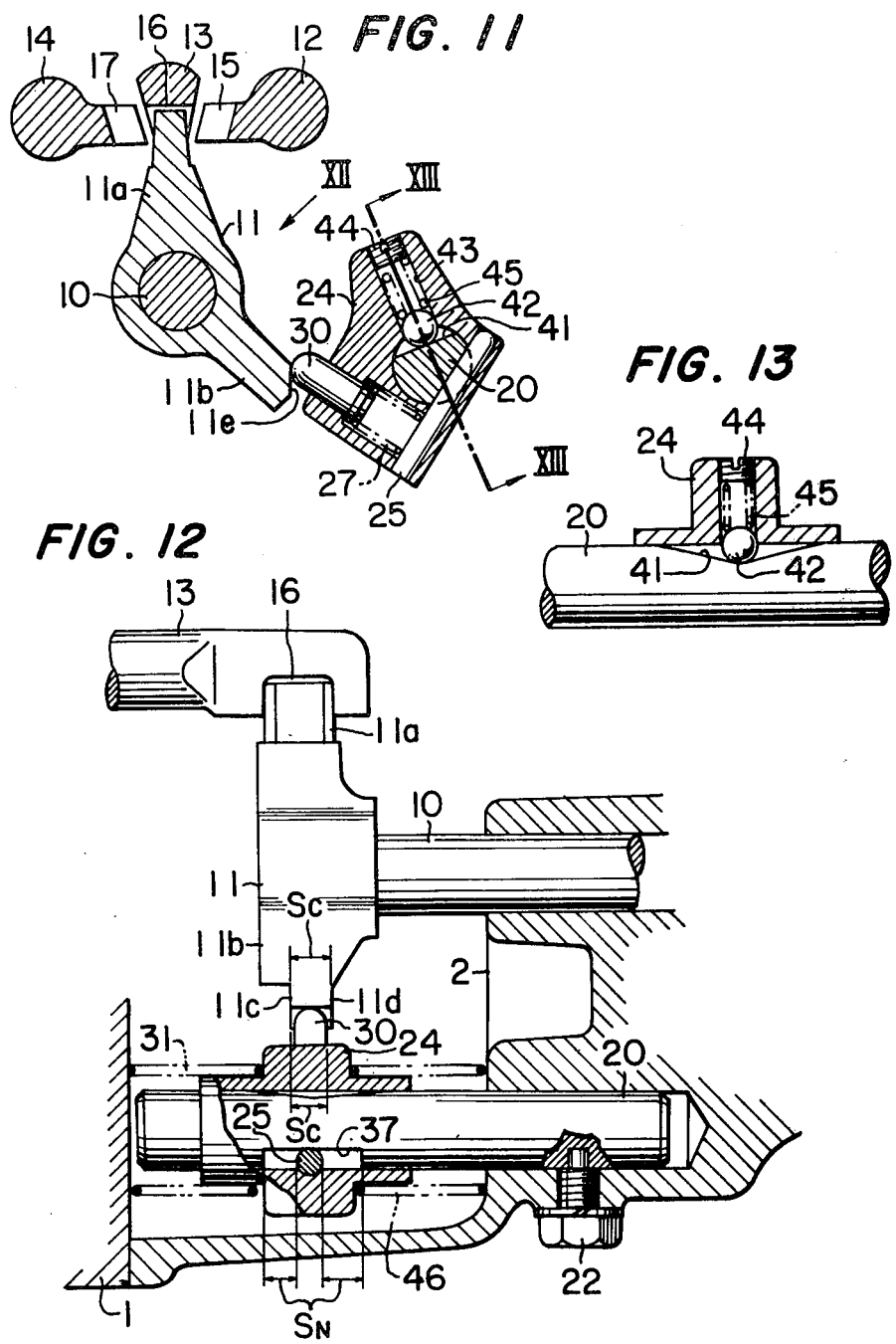

3,939,724

AUTOMOTIVE VEHICLE SHIFT CONTROL MECHANISM FOR MANUAL TRANSMISSIONS

BACKGROUND OF THE INVENTION

Field of the Invention

The present invention relates to automotive vehicle transmissions and more particularly to a shift control mechanism for a manual transmission involving a plurality of forward drive positions and a reverse drive position. The control mechanism is specifically involved with controlling movement of the shift lever between one of the forward drive positions and the reverse drive position wherein these two positions lie in a linear path through which the shift lever moves therebetween. Erroneous shifting, which might occur if the shift lever were to be moved directly through said linear path from said one forward drive position to the reverse position, is prevented.

As is well known, a shift mechanism for a manual transmission having five forward drive positions and a reverse drive position is usually arranged with a shifting pattern wherein the shift lever is moved along three linear paths, with two drive positions being located at the opposite ends of each linear path. Thus, shifting of the transmission between a first and a second speed ratio is effected by moving the shift lever between two positions lying at the ends of one of said linear paths, with the third and fourth speed ratio positions lying at the ends of a second linear path. The fifth speed ratio position and the reverse drive position are located at the ends of the third linear path of the shift lever, and when it is intended to downshift the transmission from the fifth speed ratio during high speed vehicle operation, the shift lever could inadvertently be moved into the reverse drive position thereby causing serious transmission damage and dangerous vehicle operating conditions.

Various mechanisms have been proposed to prevent such misshifting, among them being one which requires that the shift lever be pressed downwardly or pulled upwardly when it is to be moved into the reverse drive position. Another proposal has been to require manipulation of a button or the like independently of but concurrently with manipulation of the shift lever. In either case, however, such manipulation will require some difficulty or skill on the part of the vehicle operator and it becomes difficult for the operator to accomplish such manipulations with ease during operation of the vehicle with the operator sitting at a normal position in the driver's seat. Moreover, the structure of such a transmission mechanism will inevitably involve undesirable complexity.

Accordingly, the present invention is intended to provide an improved shift control mechanism for use with a multiple forward speed manual transmission in which a transmission lever is activated by manipulation of a shift lever to selectively operate one of a plurality of fork shafts of the transmission in order to effect a reverse speed ratio and one forward speed ratio which lie at opposite ends of a linear path forming a part of the shifting pattern of the shift lever.

The invention provides a mechanism of the above type which operates to control the shifting operation which occurs between the reverse speed ratio position and the one forward speed ratio position and, in one aspect thereof, the control mechanism is structured to prevent downshifting directly along a linear path of movement of the shift lever from the one forward drive position to the reverse position.

Furthermore, the mechanism of the invention operates to control shifting operation in the manner previously described without requiring other concurrent manipulative efforts, such as depression of a button or axial movement of the shift lever.

SUMMARY OF THE INVENTION

Briefly, the present invention may be described as a control mechanism for a manual multiple-forward-speed vehicle transmission having transmission means shiftable between a reverse speed ratio and a plurality of forward speed ratios, a manual shift lever controlling the transmission means by movement thereof through a shift pattern of selection positions which includes a neutral position, said shift lever being connected to shift the transmission means to the reverse speed ratio and to one of the forward speed ratios by movement of the shift lever, respectively, to a pair of selection positions which lie in a substantially linear path extending across the neutral position, and a transmission lever operatively connected between the shift lever and the transmission means to enable shift control by manipulation of the shift lever. More specifically, the control mechanism of the invention is directed to a misshift preventive mechanism for controlling movement of the shift lever along the linear path extending between the selection positions for reverse drive and said one forward drive, said misshift preventive mechanism comprising a projection extending from the transmission lever, a pin located to be engaged by said projection, a housing having said pin mounted therein for movement relative thereto between an extended position and a retracted position, said housing being mounted for movement in directions transversely of the directions of movement of said pin, with the path of movement of said housing including an initial position defined thereon, said projection being configured to cause retraction of the pin when the shift lever is moved through the neutral position into the linear path intermediate said pair of selection positions, and to permit movement of the pin to the extended position by movement of the shift lever along the linear path, with the pin being arranged to be engaged by said projection to cause movement of said housing when said shift lever is moved along said linear path with said pin in the extended position, stopper means for restricting movement of the housing, and spring means biasing the housing for movement to its initial position when engagement between said projection and said pin is released.

As will be further described in detail hereinafter, the invention involves several specific embodiments, some of which are more particularly involved with the structure for mounting the housing and the pin and for arranging the stopper means to control movement of the housing. In one specific embodiment of the invention movement of the shift lever directly through the linear path between one forward drive position and the reverse drive position is prevented while movement in the opposite direction, i.e., directly along the linear path extending from the reverse drive position to the one forward drive position, is not prevented.

In another embodiment, there is prevented direct shifting along the linear path in both directions either from the one forward drive position to the reverse position or from the reverse position to the one forward drive position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 11 is a sectional view taken along the line XI — XI of FIG. 1 showing a fifth embodiment of the present invention;

FIG. 12 is a view in side elevation partially in section looking in the direction of the arrow XII of FIG. 11; and FIG. 13 is a sectional view taken along the line XIII — XIII of FIG. 11.

DETAILED DESCRIPTION OF THE PREFERRED EMBODIMENTS

Figure 1:
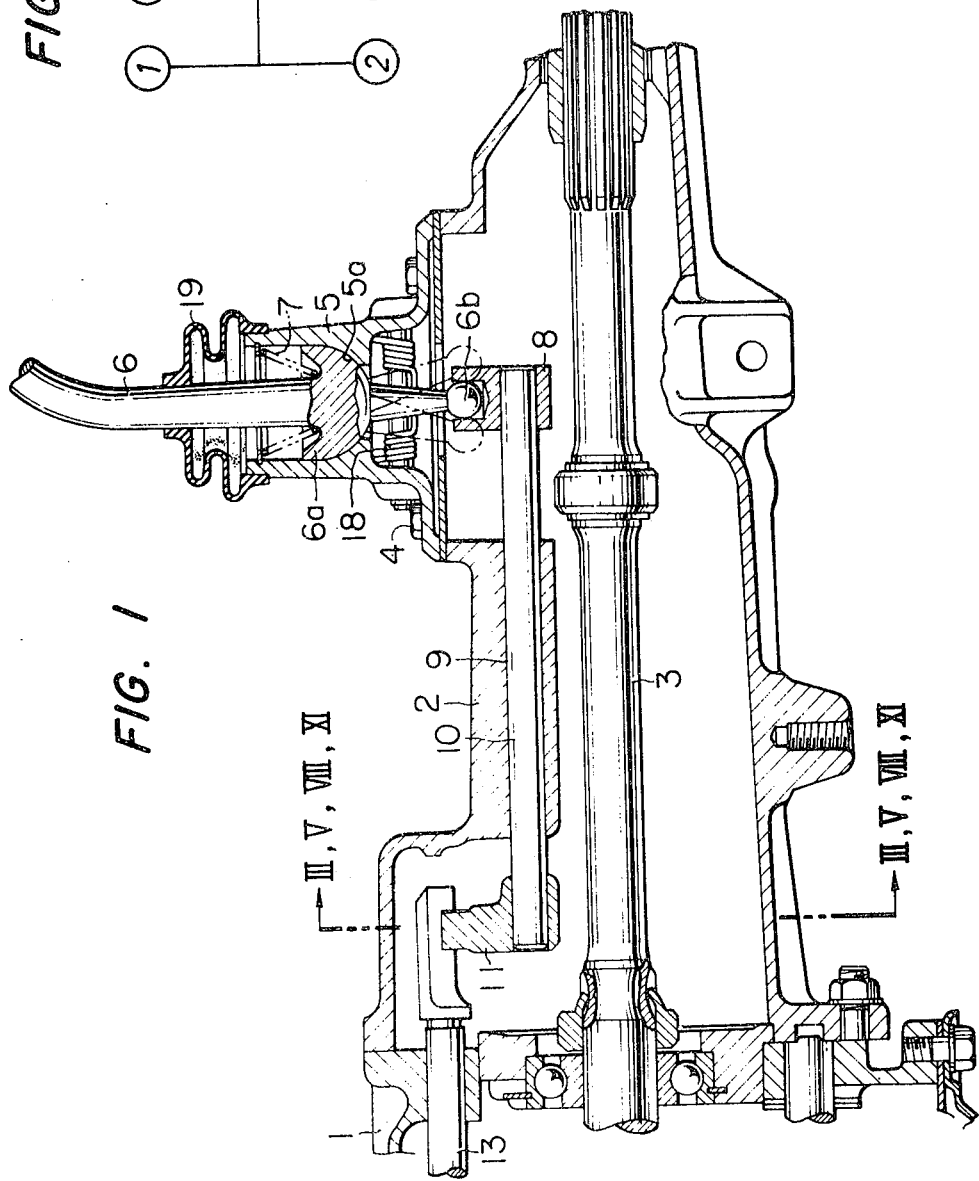
FIG. 1 is a longitudinal sectional view showing a transmission mechanism in which a shift control mechanism according to the present invention is incorporated.

Referring now to the drawings, wherein like reference numerals refer to similar parts throughout the various figures thereof, there is shown in FIG. 1 an example of a manual transmission mechanism involving five forward speed ratios and a reverse drive. A transmission gear mechanism (not shown) is accommodated at the rear of a gear casing 1 having mounted thereon an extension housing 2 through which an output shaft 3 extends. At the upper portion of the housing 2 there is secured, by means of bolts 4, a retainer 5 which supports a shift lever 6. The shift lever 6 includes an upper rounded portion 6a which is urged into contact with a rounded seat portion 5a of the retainer 5 by a spring force. The arrangement depicted enables selective shifting operation of the transmission by movement or rocking the shift lever 6 in longitudinal and transverse directions respectively.

A lower rounded portion 6b of the shift lever 6 is fitted or engaged in a shift lever housing 8 connected to one end of an intermediate rod 10 which is inserted to extend toward the gear casing 1 through a bore 9 formed in the housing 2.

The shifting and selection operations of the transmission are transmitted from the shift lever 6 as axial and revolving motions, respectively, to a transmission lever 11 by way of the intermediate rod 10. The shift lever 6, when not otherwise urged either by a manipulative effort or by engagement of the transmission gearing, is automatically returned by the action of a selection spring 18 to a central or neutral position at which its use is most frequently effected. The likelihood of seepage of deleterious materials or dust into the retainer 5 may be efficiently prevented by a boot 19 which is interposed between the shift lever 6 and the open end of the retainer 5.

Figure 3:
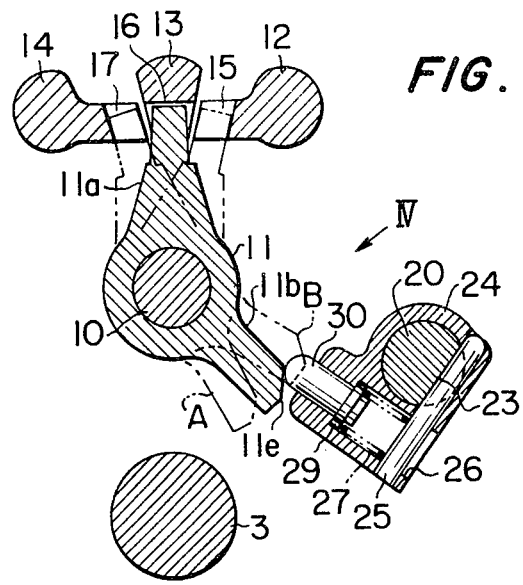
FIG. 3 is a sectional view taken along the line III — III of FIG. 1 showing a first embodiment of the present invention.

As shown in FIG. 3, the lever 11 is formed at its rearwardly extending end with a pawl portion 11a which is adapted to be selectively engageable with engagement grooves 15, 16 and 17 formed on fork shafts 12, 13 and 14, these being shown, by way of example, as comprising three in number. The fork shafts 12—14 are arranged within the gear casing 1 above the transmission gear mechanism in a manner to be moved axially thereof.

Figure 2:
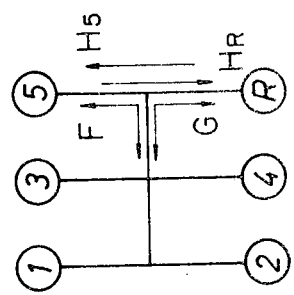
FIG. 2 is a diagrammatic outline depicting the shift pattern through which the shift lever may be moved in a transmission to which the present invention is applied.

Accordingly, by movement of the shift lever 6 to its respective selection positions, the extending pawl portion 11a will be operated to engage one of the grooves 15–17. During the shifting operation, one of the fork shafts 12–14 is moved backwardly and forwardly through engagement between the pawl portion 11a and the corresponding one of the grooves 12–14. Thus, the first and second speed ratios are obtained through the fork shaft 12, and the third and fourth speed ratios are obtained through the fork shaft 13. Moreover, the fifth and reverse speed ratios are obtained through the fork shaft 14. The resultant shift pattern through which the shift lever 6 is moved and its selective operation of the transmission is depicted in FIG. 2.

The present invention is adapted to be incorporated for use within the structural arrangement hereinbefore described to control movement of the shift lever 6 after it has been shifted to the neutral position through a releasing operation involving the highest or fifth speed ratio and the reverse drive position. The shift control mechanism of the invention will be described hereinafter in connection with the five embodiments thereof which are shown in FIGS. 3–12.

Figure 4:
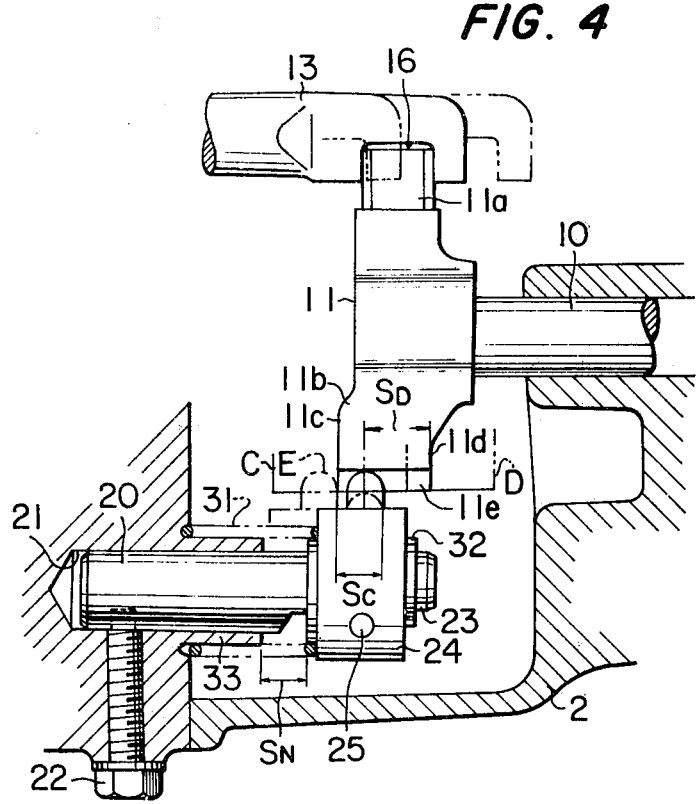
FIG. 4 is a view in side elevation partially in section looking in the direction of the arrow IV of FIG. 3.

Referring to the first embodiment of the invention which is illustrated in FIGS. 3 and 4, the transmission lever 11 is formed to include at its end opposite to the pawl portion 11a an integrally formed relatively long projection 11b which is formed at its end or side extension with an inclined plane 11e. The incline plane 11e is shown as extending rightwardly and downwardly with respect to the pawl portion 11a, as viewed in FIG. 3.

Into a bore 21 which is formed in the gear casing 1 near the projection 11b, there is inserted a guide shaft 20 which is fastened by a bolt 22. Fitted on the free-end portion of the guide shaft 20 is a housing 24 which may be moved in the axial direction of the shaft 20 but which is prevented from revolving relative thereto by a locking pin 25 which is arranged to contact a notched plane 23 formed on the shaft 20. The housing 24 is formed with a stepped bore 26 extending perpendicularly of the locking pin 25 lying on a plane normal to the guide shaft 20. Into the bore 26 there is inserted a pin 30 which protrudes from the housing 24 to a degree regulated by a flange 29 engaging the stepped portion of the bore 26. The pin 30 is arranged to be moved between an extended position relative to the housing 24 and a retracted position by movement against the action of a spring 27 which is interposed between the pin 30 and the locking pin 25.

With the shift lever 6 at the selection positions for the third and fourth speed ratios, the relative position of the pin 30 is determined by contact effected between the leading end of the pin and the inclined plane 11e of the projection 11b. At the selection positions for the fifth and reverse speed ratios, on the other hand, the pin 30 will have its axis common to that of the projection 11b or aligned therewith. A spring 31 is interposed between the housing 24 and the gear casing 1. A snap ring 32 is mounted on the guide shaft 20 for preventing the housing from moving beyond the right hand end of the guide shaft 20 as viewed in FIG. 4. A stopper 33 is formed on the gear casing 1 for regulating movement of the housing 24 effected by engagement of the projection 11b with the pin 30 whereby axial movement of the housing 24 along the guide shaft 20 leftwardly as viewed in FIG. 4 is limited.

In the construction of the mechanism according to the present invention certain dimensional relationships are developed between certain parts of the mechanism including the projection 11b of the lever 11, the pin 30 of the housing 24 and the stopper means 33. Since a distance $S_C$ between a front end surface 11c of the projection 11b and the outer rear surface of the pin 30 is preset to be smaller than a shift stroke $S_5$ for the fifth speed ratio, the pin 30 is released from engagement with the projection 11b upon occurrence of the shifting operation to the fifth speed ratio. Moreover, since a distance $S_D$ between a rear surface 11d of the projection 11b and the center line of the pin 30 is preset to be larger than a shift stroke $S_R$ for the rear speed ratio, the pin 30 is locked in engagement with the projection 11b upon shifting operation to the reverse drive position.

On the other hand, since the distance $S_C$ is made equal to a distance $S_N$ extending between the housing 24 and the stopper 33, when the shift lever 16 is moved to release the transmission from the fifth speed ratio, the housing 24 is brought into contact with the stopper 33 by virtue of engagement between the projection 11b and the pin 30 and the lever 11 is stopped at the neutral position so that erroneous overshifting to the reverse speed ratio cannot occur.

In this respect, if the distance $S_N$ should be made smaller than the distance $S_C$, the lever 11 would be stopped during its travel to the neutral position, and at the same time the engagement grooves 15–17 of the respective fork shafts 12–14 would be misaligned. Indeed, the distance $S_N$ is made slightly larger than the distance $S_C$ due to assembly or machining errors, and the discrepancy is such that the sleeve in the transmission gear mechanism is almost out of meshing engagement with the gear spline of the reverse gear when the shifting operation is accomplished from the fifth speed ratio to the neutral position.

In an arrangement having the above described dimensional relationships and involving a shift pattern such as is depicted in FIG. 2, when the shift lever 6 is rocked leftwardly, the lever 11 will be inclined, as shown by a dotted line A in FIG. 3, so that the projection 11b will be relieved from contact with the pin 30 with the pawl portion 11a being brought into engagement with groove 15 of the fork shaft 12. As a result, the first or second speed ratio will be achieved in a manner similar to that occurring in a conventional transmission mechanism.

When the shift lever 6 is released from the hand of the driver or is manually shifted to the center position at the selection position for the first and second speed ratios, the inclined plane 11e of the projection 11b is brought into contact with the pin 30, as shown by a solid line in FIG. 3, and its selection position is determined in this manner. Under this condition, the pawl portion 11a engages the groove 16 of the fork shaft 13, thus effecting the third or fourth speed ratio.

On the other hand, when the shift lever 6 is rocked rightwardly, the pin 30 will be retracted as a result of its engagement against the inclined plane 11e thereby moving the pin against the action of the spring 27 inwardly of the housing 24. As a result, the lever 11 will ride over the pin 30 as shown by the dotted line B in FIG. 3 thus enabling the shift lever 6 to be brought to either the fifth or reverse speed ratio positions.

Therefore, when a shifting operation to the reverse speed ratio is performed, the projection 11b will be maintained in engagement with the pin 30 as shown at a dotted line C in FIG. 4 thus making it possible to accomplish a release shifting operation from the reverse speed ratio. On the other hand, when a shifting operation to the fifth speed ratio is effected, the projection 11b will move beyond the pin 30 as shown at a dotted line D in FIG. 4, and the pin 30 will be returned by the action of the spring 27 to its initial extended position where it will further protrude from the housing 24.

Accordingly, when the lever 11 is returned to the neutral position during a release shifting operation from the fifth speed ratio, the front end 11c of the projection 11b will overlap the pin 30 and will be brought into abutting engagement therewith. As a result, the housing 24 will be moved against the action of the spring 31 and at the neutral position the housing 34 will abut the stopper 33, as shown at a dotted line E of FIG. 4. Thus, the lever 11 will be locked at the neutral position and will be blocked from completing an overshift movement to the reverse speed ratio.

At this point in the operation of the transmission, if the shift lever 6 is rocked toward the center or neutral position after it has been released from the fifth speed ratio position, the front end 11c of the projection 11b will be moved out of engagement with the pin 30 and the housing 24 will be returned to its initial position depicted in solid line form in FIG. 4, by the action of the spring 31. Thus, downshifting to the fourth speed ratio or to other selection positions may be subsequently accomplished.

Figure 5:
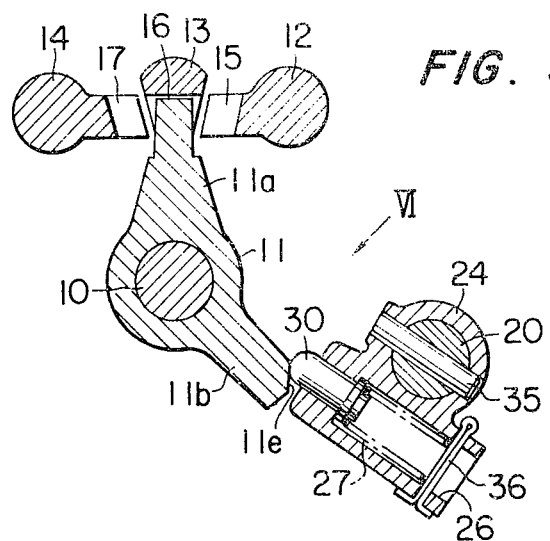
FIG. 5 is a sectional view taken along the line V — V of FIG. 1 showing a second embodiment of the present invention.
Figure 7:
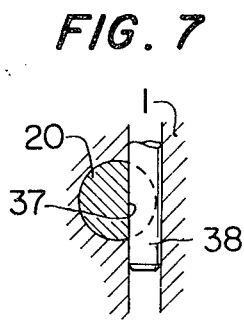
FIG. 7 is a sectional view taken along the line VII — VII of FIG. 6.
Figure 6:
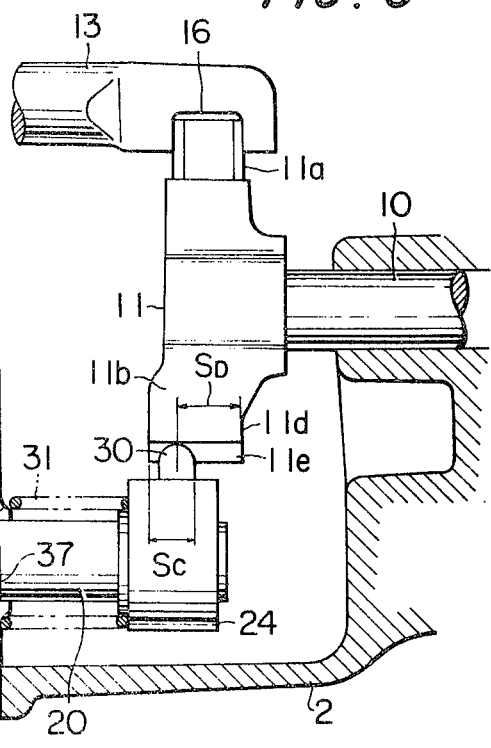
FIG. 6 is a view in side elevation partially in section looking in the direction of the arrow VI of FIG. 5.

Referring now to the second embodiment of the present invention which is depicted in FIGS. 5–7, wherein like reference numerals will be used to refer to similar parts such as those described in connection with the first embodiment, it will be seen that the housing 24 is arranged to be fixedly mounted upon the guide shaft 20 by means of a locking pin 35 which not only prevents axial sliding movement of the housing 24 along the shaft 20 but which also inhibits relative rotation therebetween.

The spring 27 is retained in place by a cotter pin 36 which engages one end of the spring. The guide shaft 20 is also formed with a slot 37 within which a pin 38 is engaged. The pin 38 is also fitted to engage the gear casing 1 in a manner which enables relative motion between the gear casing 1 and the guide shaft 20 but which appropriately limits the range of this relative motion. In the structure of the second embodiment, as most clearly seen in FIG. 6, the distance $S_N$ between the pin 38 and the rightmost end of the slot 37 is dimensioned to be equal to the distance $S_C$. The housing 24 is moved during a release shifting operation from the fifth speed ratio position together with the guide shaft 20 so that the lever 11 may be locked against further movement in the direction of the reverse position by the combined cooperative action between the slot 37 and the pin 38. Thus, it will be seen that pin 38 cooperating with the slot 37 and engaged against the gear housing 1 will operate a stopper means limiting the axial movement of the guide shaft 20 relative to the casing 1 and consequently also limiting the movement of the housing 24.

Figure 8:
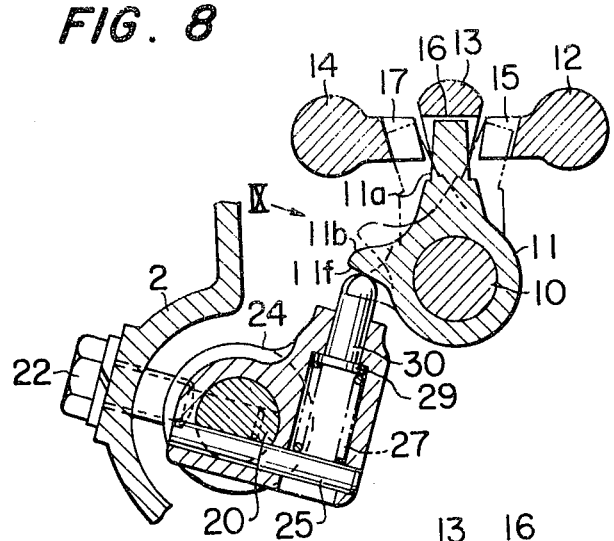
FIG. 8 is a sectional view taken along the line VIII — VIII of FIG. 1 showing a third embodiment of the present invention.
Figure 9:
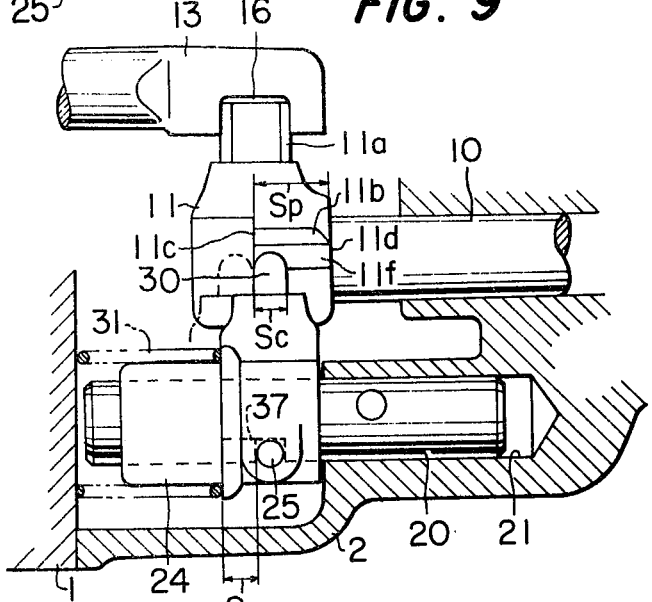
FIG. 9 is a view in side elevation partially in section looking in the direction of the arrow IX of FIG. 8.

In a third embodiment of the present invention depicted in FIGS. 8–9, which involves parts similar to those of the previously described embodiments, the transmission lever 11 has its projection 11b formed at its leftward side as viewed in FIG. 8 with a flat portion 11f. The guide shaft 20 is inserted in the bore 21 of the extension housing 2 and is fixedly mounted therein by fastening bolt 22. The housing 24 is slidably fitted upon the guide shaft 20 and the pin 30, which may be moved between a retracted and extended position against the action of the spring 27, is arranged to abut or become disengaged from the flat portion 11f. The locking pin 25 is formed to extend through the housing 24 to engage one end of the spring 27 and to also engage the slot 37 of the guide shaft 20 within which this pin is fitted so as to prevent the housing 24 from revolving relative to the pin 20. However, sliding movement axially of the shaft 20 by the housing 24 is enabled within desired limits by the engagement between the pin 25 and the slot 37 in the same manner as described in connection with FIG. 6 with regard to the slot 37 and the pin 38 depicted therein. Thus, the pin 25 and the slot 37 shown in FIG. 9, operate as the stopper means of the invention. With the shift lever 6 positioned at the selection position between the fifth speed ratio and the reverse drive position, therefore, the pin 30 will be retracted directly by the action of the flat portion 11f and it will be seen that the resultant operation of this third embodiment depicted in FIGS. 8–9 will be similar to that of the first embodiment described in connection with FIGS. 3–4.

Figure 10:
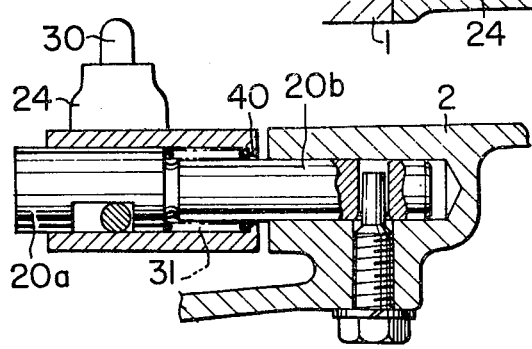
FIG. 10 is a view in side elevation partially sectioned showing a fourth embodiment of the present invention.

A fourth embodiment of the present invention as depicted in FIG. 10 includes a spring 31 which is connected within the mechanism in a manner somewhat different from that previously described. In this instance, the guide shaft 20 comprises a stepped construction and includes a larger diameter portion 20a and a smaller diameter portion 20b. The housing 24 which has the pin 30 movably mounted thereon is formed at its inner side with a flange 40 located to engage one end of the spring 31 with the spring 31 being interposed between the large diameter portion 20a of the guide shaft 20 and the flange 40 of the housing 24. Thus, it will be seen that in this embodiment, the spring 31 is engaged to effect relative motion between the housing 24 and the guide shaft 20 to return the housing 24 to its initial position after it has been moved therefrom by operation of the transmission in the manner previously described. Other structure of this embodiment, as will be apparent from the description contained herein, is similar to that of embodiments previously described.

In the four embodiments described thus far, only shifting directly along a linear path from the fifth speed ratio position to the reverse position is prevented. This is depicted and identified by the arrow $H_R$ shown in FIG. 2. However, shifting in the directions of arrows F, G and $H_5$ shown in FIG. 2 may be effected without blockage. In the fifth embodiment of the present invention, however, direct shifting from the reverse drive position to the fifth speed ratio position is additionally prevented in order to provide enhanced advantages from the standpoint of safety. This portion of the shifting pattern is identified by the arrow $H_5$ in FIG. 2. The fifth embodiment of the invention, which is depicted in FIGS. 11–13, is similar in several respects to the first embodiment and in the description which follows emphasis will be placed upon the differences involved therebetween. The width of the projection 11b of the transmission lever 11 in the fifth embodiment is made smaller than in previous embodiments so that it may move out of engagement with the pin 30 when the shift lever 6 is moved to both the fifth speed ratio position and the reverse speed ratio position. Thus, with reference to FIG. 12, it will be seen that when the lever 11 is moved either leftwardly or rightwardly the projection 11b will slide off the pin 30 so that when the lever 11 is retracted the sides of the projection 11b will abut the side of the pin 30 which has moved to its extended position thereby effecting movement of the housing 24. The distances between the outer peripheries of the locking pin 25, which is inserted in the housing 24, and the corresponding ends of the slot 37 of the guide shaft 20, which is attached through the extension housing 2 in a manner similar to the third embodiment, are made of an identical value $S_N$ so that shifting to the fifth speed ratio and reverse drive may be accomplished. At the side of the guide shaft 20 opposite the slot 37 there is formed a dovetail cam groove 41 upon which a ball 42 is pressed for abutment by action of a spring 45 interposed within a bore 43 of the housing 24 between the ball 42 and a screw head 44. Two springs 32 and 46 having the same spring load are respectively interposed between the housing 24 and the gear casing 1 and between the housing 24 and the extension housing 2.

Thus, when shifting occurs to both the fifth and reverse positions, the projection 11b will be released from engagement with the pin 30 and movement from either of these positions to the neutral position will cause the housing to be moved against the actions of the springs 45 and 31 or 46, and further movement of the housing 24 will be blocked by both the spring forces and by contact between the pin 25 and the sides of the slot 37. Accordingly, not only will overshifting from the fifth speed ratio position to the reverse drive position be effectively prevented but there will also be prevented overshifting in the reverse direction directly from the reverse drive position to the fifth speed ratio position.

As has been previously described, in the case where selection positions of the reverse drive and fifth speed ratios are located at the opposite ends of a straight line path of the shift pattern, the shift lever 6 will be blocked after it has been shifted to the neutral position when a release shifting operation from the fifth speed ratio position occurs. Accordingly, a shifting operation to the reverse speed ratio position cannot be effected without first returning the shift lever 6 to the central neutral position. As a result, erroneous shifting from the fifth speed ratio position to the reverse drive position is prevented completely when such shifting is attempted directly along the straight path. Moreover, safe shifting during normal operation to the reverse drive position may be accomplished with ease without requiring pulling or pushing of the shift lever or manipulation of a button. It will be seen, accordingly, that the shifting operations may thus be simplified and the feeling which is imparted during shifting may be commensurately improved. In comparison with the first and second embodiments of the invention wherein the guide shaft 20 is attached to the gear casing 1, the third embodiment is adapted to advantageously simplify the assembly by attaching the guide shaft 20 to the extension housing 2. Moreover, in the case where the distance between the gear casing 1 and the housing 2 is relatively large, it is preferable to interpose the spring 31 between the housing 24 and the guide shaft 20 rather than between the housing 24 and the gear casing 1, as is exemplified in the third embodiment. In the fifth embodiment, erroneous shifting operation from the reverse drive position to the fifth speed ratio position may be additionally prevented thus improving the safety features of the transmission mechanism.

It should be understood that the concept of the present invention may also be practically applied in a transmission mechanism for a truck, in which the shift position for reverse drive and the fifth speed ratio are located at the opposite ends of an identical straight line path of the shift pattern. Moreover, the shift control mechanism of the present invention may be disposed directly below the shift lever 6.

While specific embodiments of the invention have been shown and described in detail to illustrate the application of the inventive principles, it will be understood that the invention may be embodied otherwise without departing from such principles.

What is claimed is:

1. In a manual multiple-forward-speed vehicle transmission having transmission means shiftable between a reverse drive and a plurality of forward speed ratios, a manual shift lever controlling said transmission means by movement through a shift pattern of selection positions including a neutral position, said shift lever being connected to shift said transmission means to said reverse drive and to one forward speed ratio by movement thereof, respectively, to a pair of selection positions lying at the ends of a substantially linear path extending across said neutral position, and a transmission lever operatively interconnected between said shift lever and said transmission means; a misshift preventive mechanism for controlling movement of said shift lever along said linear path between said selection positions for said reverse drive and said one forward speed ratio, said misshift preventive mechanism comprising a projection extending from said transmission lever, a pin located to be engaged by said projection, a housing having said pin mounted therein for movement relative thereto between an extended position and a retracted position, said housing being mounted for movement in directions transversely of the directions of movement of said pin with the path of movement of said housing including an initial position defined therealong, said projection being configured to cause retraction of said pin when said shift lever is within said linear path at said neutral position and to permit movement of said pin to said extended position when said shift lever is moved along said linear path away from said neutral position, said pin being arranged to be engaged by said projection when said pin is in said extended position to cause movement of said housing when said shift lever is moved along said linear path, stopper means for restricting movement of said housing, and spring means biasing said housing for movement to its initial position.

2. A mechanism according to claim 1 including a guide shaft having said housing mounted thereon for guiding said housing for movement in directions parallel to the directions of movement of said projection caused by movement of said shift lever along said linear path.

3. A mechanism according to claim 1 wherein said projection is configured to effect movement of said pin to said extended position when said shift lever is in a selection position corresponding to said one forward speed ratio, said stopper means being arranged to permit said shift lever to be moved along said linear path from said one forward speed position to said neutral position but to prevent movement of said shift lever along said linear path directly from said one forward speed position to said reverse position.

4. A mechanism according to claim 1 wherein said projection is configured to effect movement of said pin to said extended position when said shift lever is in a selection position corresponding to said reverse drive, said stopper means being arranged to permit said shift lever to be moved along said linear path from said reverse drive position to said neutral position, but to prevent movement of said shift lever along said linear path directly from said reverse drive position to said one forward speed ratio position.

5. A mechanism according to claim 1 wherein said projection is configured to effect movement of said pin to said extended position during movement of said shift lever within said linear path only when said shift lever is between said one forward speed ratio position and said neutral position whereby only direct movement along said linear path of said shift lever from said one forward speed ratio position to said reverse drive position is blocked.

6. A mechanism according to claim 1 wherein said projection is configured to effect movement of said pin to said extended position when said shift lever is within said linear path both in said one forward speed ratio position and in said reverse drive position whereby movement of said shift lever along said linear path directly between said one forward speed ratio position and said reverse drive position is blocked in both directions.

7. A mechanism according to claim 1 wherein said projection is configured to move said pin to said retracted position whenever said shift lever is within said linear path at said neutral position with said housing at its initial position.

8. A mechanism according to claim 2 wherein said transmission includes a casing and wherein said guide shaft is fixably mounted relative to said casing with said housing being slidably mounted along said guide shaft.

9. A mechanism according to claim 8 wherein said spring means is interposed between said housing and said casing.

10. A mechanism according to claim 9 wherein said stopper means is fixed relative to said casing and is located to block sliding movement of said housing along said guide shaft at a predetermined position.

11. A mechanism according to claim 2 wherein said transmission includes a casing and wherein said guide shaft is mounted upon said casing for axial sliding movement relative thereto, with said housing being fixedly mounted upon said guide shaft and with said stopper means being interposed between said guide shaft and said casing to limit relative movement therebetween.

12. A mechanism according to claim 11 wherein said spring means is interposed between said casing and said housing.

13. A mechanism according to claim 8 wherein said guide shaft comprises a stepped configuration defining a smaller diameter portion and a larger diameter portion and an abutment surface therebetween, wherein said housing is arranged to slide along said large diameter portion to be guided thereby with a portion of said housing extending to about said smaller diameter portion, and wherein said spring means is interposed about said smaller diameter portion between said housing and said abutment surface with said stopper means being interposed between said guide shaft and said housing.

14. A mechanism according to claim 6 wherein said transmission includes a casing, said mechanism further comprising a guide shaft mounted upon said casing, means mounting said housing upon said guide shaft for movement relative to said casing in directions parallel to the directions of movement of said projection caused by movement of said shift lever along said linear path, said housing being movable to positions on opposite sides of said initial position with said spring means being arranged to bias said housing for movement back to said initial position whenever displaced therefrom to both said opposite sides, and with said projection being configured to move said pin to said retracted position only when said shift lever is within said linear path at said neutral position while said housing is simultaneously at said initial position.

15. A mechanism according to claim 14 wherein said guide shaft is fixed relative to said casing and has said housing slidably mounted thereon, with said stopper means being interposed between said guide shaft and said housing to limit relative sliding movement therebetween, and wherein said spring means is arranged on opposite sides of said housing to bias said housing toward said initial position.

* * * * *